United States Patent
Peros et al.

(10) Patent No.: US 11,543,973 B2
(45) Date of Patent: Jan. 3, 2023

(54) TECHNIQUES FOR SOFTWARE RECOVERY AND RESTORATION

(71) Applicant: EMC IP Holding Company LLC, Hopkinton, MA (US)

(72) Inventors: Roko Peros, Holly Springs, NC (US); Kenneth D. Lee, Hillsborough, NC (US); Peter J. McCann, Mason, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 170 days.

(21) Appl. No.: 17/027,853

(22) Filed: Sep. 22, 2020

(65) Prior Publication Data

US 2022/0091755 A1    Mar. 24, 2022

(51) Int. Cl.
    *G06F 11/00*   (2006.01)
    *G06F 3/06*    (2006.01)
    *G06F 8/61*    (2018.01)
    *G06F 11/14*   (2006.01)

(52) U.S. Cl.
    CPC .......... *G06F 3/0619* (2013.01); *G06F 3/067* (2013.01); *G06F 3/0629* (2013.01); *G06F 3/0644* (2013.01); *G06F 3/0659* (2013.01); *G06F 8/61* (2013.01); *G06F 11/1417* (2013.01); *G06F 11/1458* (2013.01); *G06F 11/1469* (2013.01)

(58) Field of Classification Search
    CPC ............ G06F 11/1417; G06F 11/1458; G06F 11/1469
    See application file for complete search history.

(56) References Cited

U.S. PATENT DOCUMENTS

| | | | |
|---|---|---|---|
| 6,205,527 B1 * | 3/2001 | Goshey | G06F 11/1461 714/E11.121 |
| 2022/0091755 A1 * | 3/2022 | Peros | G06F 3/0659 |

OTHER PUBLICATIONS

Itzikr's Blog, "What Is Dell EMC PowerStore—Part 1, Overview," https://volumes.blog/2020/05/05/what-is-powerstore-part-1-overview/, May 5, 2020.

* cited by examiner

*Primary Examiner* — Philip Guyton
(74) *Attorney, Agent, or Firm* — Muirhead and Saturnelli, LLC

(57) ABSTRACT

Techniques for rebooting a node may include: performing first processing that fails to reboot the node using a primary storage device of the node; responsive to the first processing failing to reboot the node using the primary storage device of the node, performing second processing that reboots the node using a secondary storage device of the node and executes a recovery operating system of the secondary storage device; determining, by the recovery operating system executing first code, whether the primary storage device of the node meets one or more criteria indicating that the primary storage device is faulty or defective; and responsive to determining the primary storage device of the node meets the one or more criteria, performing third processing that restores the primary storage device using the secondary storage device.

19 Claims, 6 Drawing Sheets

TECHNIQUES FOR SOFTWARE RECOVERY AND RESTORATION

BACKGROUND

Technical Field

This application generally relates to recovery and restoration of software, such as an operating system and other software components of a system software stack.

Description of Related Art

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for rebooting a node comprising: performing first processing that fails to reboot the node using a primary storage device of the node; responsive to the first processing failing to reboot the node using the primary storage device of the node, performing second processing that reboots the node using a secondary storage device of the node and executes a recovery operating system of the secondary storage device; determining, by the recovery operating system executing first code, whether the primary storage device of the node meets one or more criteria indicating that the primary storage device is faulty or defective; and responsive to determining the primary storage device of the node meets the one or more criteria, performing third processing that restores the primary storage device using the secondary storage device. The one or more criteria may indicate one or more conditions denoting a health and status of the primary storage device. The one or more criteria may include determining that the primary storage device does not include a valid partition table. The one or more criteria may include determining that the primary storage device does not include a bootable partition.

In at least one embodiment, the secondary storage device may include first content and the third processing may include populating the primary storage device with the first content of the secondary storage device. The first content may include a base operating system. The first content may include one or more software components of a system software stack. The one or more software components may include a first component that performs block storage services, a second component that performs file storage services, a third component that is included in the data path or I/O path, and a fourth component that is included in the control path or management path. Configuration data may include customizations performed to the base operating system and the one or more software components during a first installation performed prior to performing the method. The third processing may include customizing the base operating system and the one or more software components stored on the primary device in accordance with the customizations of the configuration data. The configuration data is stored on a third storage device attached to the node, wherein the third storage device is configured to include at least one logical device, and wherein the third storage device provides back-end non-volatile physical storage provisioned for the at least one logical device. The configuration data may include a first customization indicating whether block storage services are enabled for the node and may include a second customization indicating whether file storage services are enabled for the node.

In at least one embodiment, the second processing may include locating a bootable partition of the secondary storage device, wherein the bootable partition includes the recovery operating system; booting the node using the bootable partition; and loading and executing the recovery operating system of the bootable partition of the secondary storage device. The primary storage device and the secondary storage device may be internal storage devices of the node. The primary storage device may be designated as the primary boot device and the secondary storage device may be designated as the secondary boot device.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
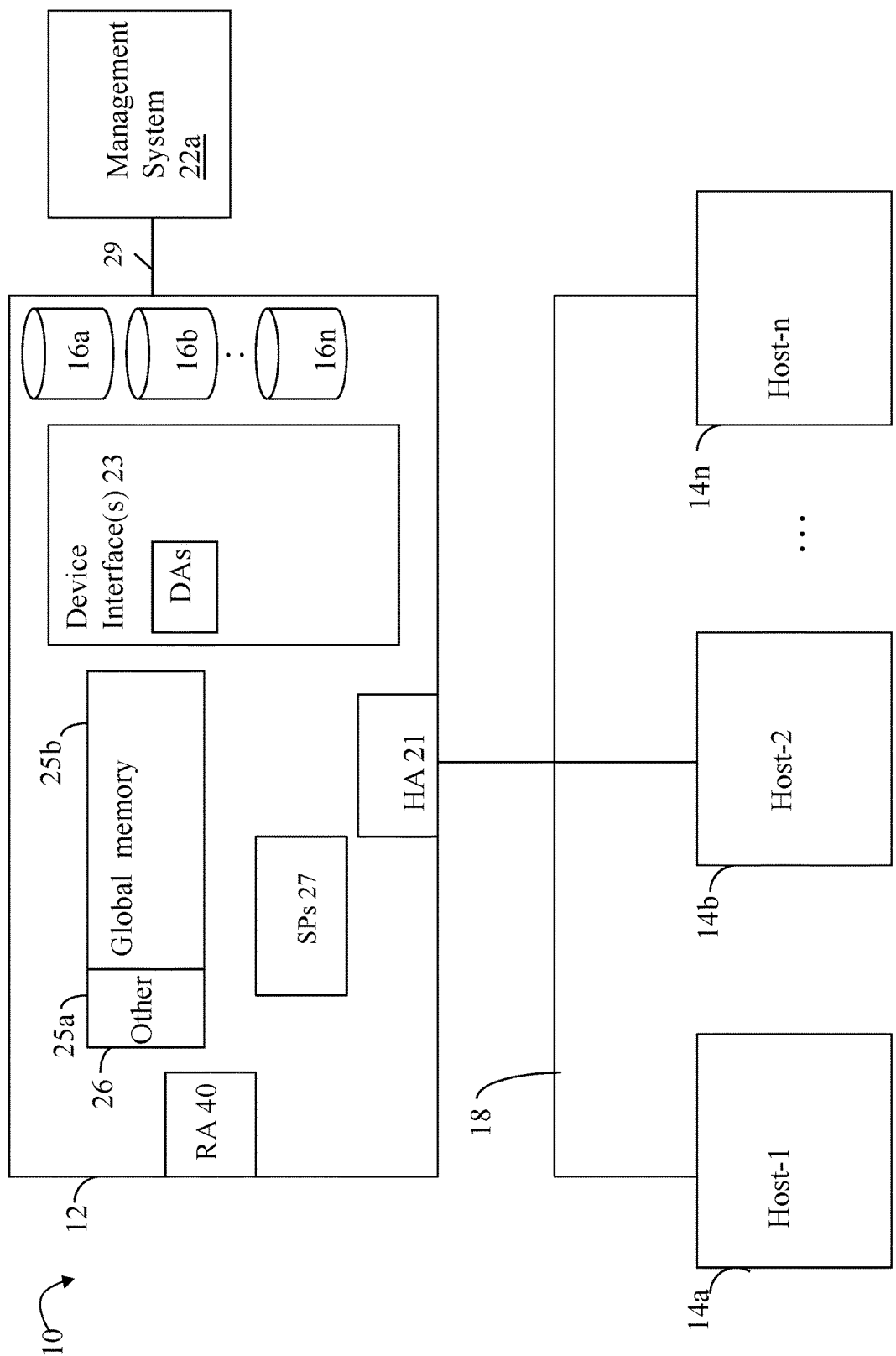
FIG. 1 is an example of components that may be included in a system in accordance with the techniques described herein.

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI, Fibre Channel, iSCSI), file system-based protocols (e.g., NFS or network file server), and the like. Some or all of the connections by which the hosts 14a-14n and the data storage system 12 may be connected to the communication medium 18 may pass through other communication devices, such as switching equipment, a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although the element 12 is illustrated as a single data storage system, such as a single data storage array, the element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of adapters or directors, such as an HA 21 (host adapter), RA 40 (remote adapter), and/or device interface(s) 23. Each of the adapters may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage device interfaces 23 may include device interface modules, for example, one or more disk adapters (DAs) (e.g., disk controllers) for interfacing with the flash drives or other physical storage devices (e.g., PDS 16a-n). The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, the HAs and/or the RAs in a data storage array. In one embodiment, the device interfaces 23 may perform data operations using a system cache that may be included in the global memory 25b, for example, when communicating with other device interfaces and other components of the data storage array. The other portion 25a is that portion of the memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may include one or more type of device interface used in connection with facilitating data transfers to/from the associated disk drive(s) and LUN (s) residing thereon. For example, such device interfaces may include a device interface used in connection with facilitating data transfers to/from the associated flash devices and LUN(s) residing thereon. It should be noted that an embodiment may use the same or a different device interface for one or more different types of devices than as described herein.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

Information regarding the data storage system configuration may be stored in any suitable data container, such as a database. The data storage system configuration information stored in the database may generally describe the various physical and logical entities in the current data storage system configuration. The data storage system configuration information may describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule or other trigger conditions of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

Consistent with other discussion herein, management commands issued over the control or data path may include commands that query or read selected portions of the data storage system configuration, such as information regarding the properties or attributes of one or more LUNs. The management commands may also include commands that write, update, or modify the data storage system configuration, such as, for example, to create or provision a new LUN (e.g., which may result in modifying one or more database tables such as to add information for the new LUN), to modify an existing replication schedule or configuration (e.g., which may result in updating existing information in one or more database tables for the current replication schedule or configuration), to delete a LUN (e.g., which may include deleting the LUN from a table of defined LUNs and may also include modifying one or more other database tables to delete any existing snapshots of the LUN being deleted), and the like.

It should be noted that each of the different adapters, such as each HA, DA, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, the techniques herein may be used in connection with any suitable storage system, appliance, device, and the like, in which data is stored. For example, an embodiment may implement the techniques herein using a midrange data storage system, such as a Dell EMC Unity® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on management system 22*a* to the data storage system 12. Such commands may be, for example, to establish or modify data services, provision storage, perform user account management, and the like. Consistent with other discussion herein, the management commands may result in processing that includes reading and/or modifying information in the database storing data storage system configuration information. For example, management commands that read and/or modify the data storage system configuration information in the database may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22*a* to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

Figure 2:
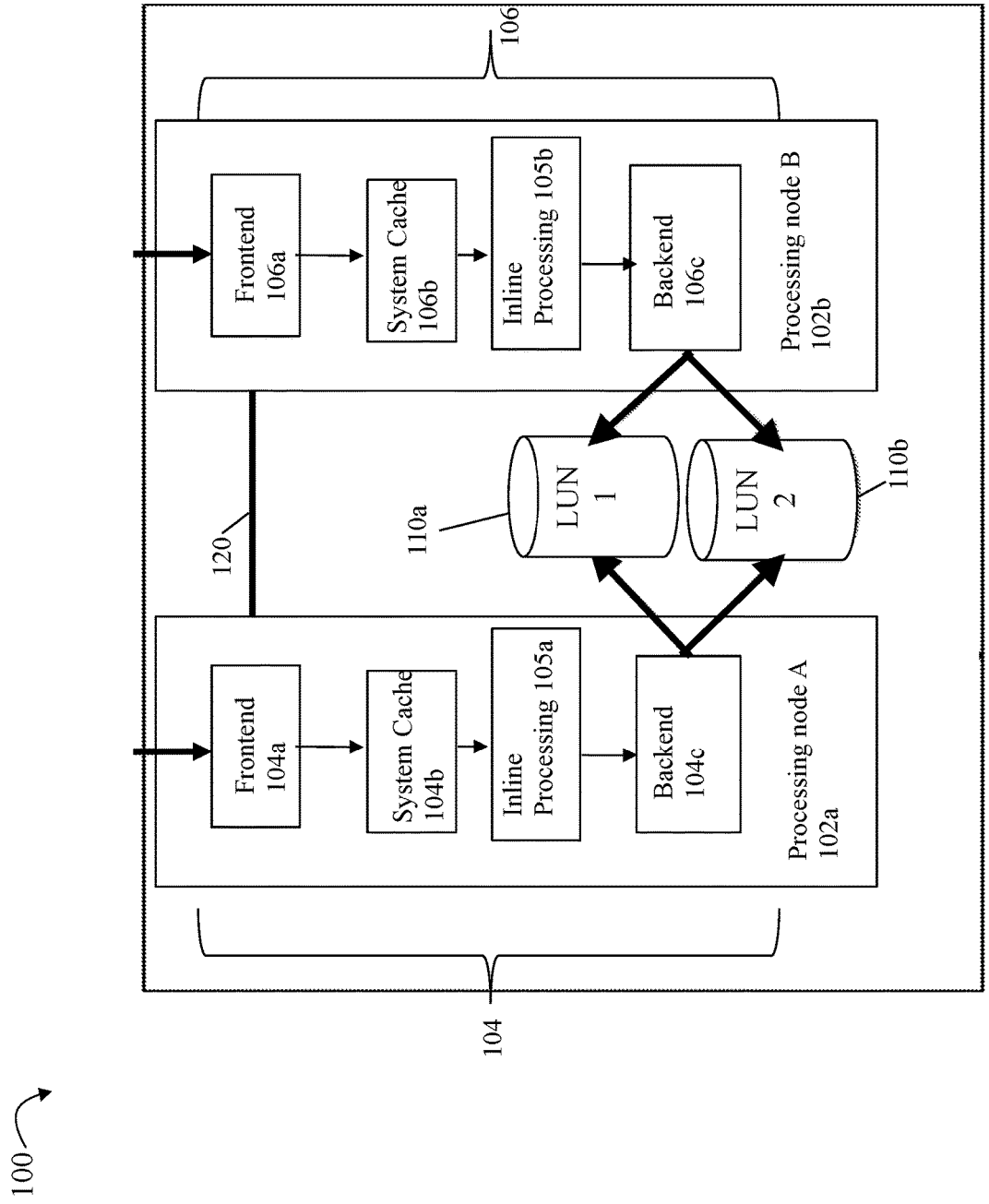
FIG. 2 is an example illustrating the PO path or data path in connection with processing data in an embodiment in accordance with the techniques herein.

With reference to the FIG. 2, shown is an example 100 illustrating components that may be included in the data path in at least one existing data storage system in accordance with the techniques herein. The example 100 includes two processing nodes A 102*a* and B 102*b* and the associated software stacks 104, 106 of the data path, where I/O requests may be received by either processing node 102*a* or 102*b*. In the example 200, the data path 104 of processing node A 102*a* includes: the frontend (FE) component 104*a* (e.g., an FA or front end adapter) that translates the protocol-specific request into a storage system-specific request; a system cache layer 104*b* where data is temporarily stored; an inline processing layer 105*a*; and a backend (BE) component 104*c* that facilitates movement of the data between the system cache and non-volatile physical storage (e.g., back end physical non-volatile storage devices or PDs accessed by BE components such as DAs as described herein). During movement of data in and out of the system cache layer 104*b* (e.g., such as in connection with read data from, and writing data to, physical storage 110*a*, 110*b*), inline processing may be performed by layer 105*a*. Such inline processing operations of 105*a* may be optionally performed and may include any one of more data processing operations in connection with data that is flushed from system cache layer 104*b* to the back-end non-volatile physical storage 110*a*, 110*b*, as well as when retrieving data from the back-end non-volatile physical storage 110*a*, 110*b* to be stored in the system cache layer 104*b*. In at least one embodiment, the inline processing may include, for example, performing one or more data reduction operations such as data duplication or data compression. The inline processing may include performing any suitable or desirable data processing operations as part of the I/O or data path.

In a manner similar to that as described for data path 104, the data path 106 for processing node B 102*b* has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O may be directed to a location or logical address of a LUN and where data may be read from, or written to, the logical address. The LUNs 110a, 110b are examples of storage objects representing logical storage entities included in an existing data storage system configuration. Since, in this example, writes directed to the LUNs 110a, 110b may be received for processing by either of the nodes 102a and 102b, the example 100 illustrates what may also be referred to as an active-active configuration.

In connection with a write operation as may be received from a host and processed by the processing node A 102a, the write data may be written to the system cache 104b, marked as write pending (WP) denoting it needs to be written to the physical storage 110a, 110b and, at a later point in time, the write data may be destaged or flushed from the system cache to the physical storage 110a, 110b by the BE component 104c. The write request may be considered complete once the write data has been stored in the system cache whereby an acknowledgement regarding the completion may be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations may be performed. For example, the inline processing may include performing data compression processing, data deduplication processing, and the like, that may convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b may be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 may be used for internode communication between the nodes 102a, 102b.

In connection with at least one embodiment in accordance with the techniques herein, each processor or CPU may include its own private dedicated CPU cache (also sometimes referred to as processor cache) that is not shared with other processors. In at least one embodiment, the CPU cache, as in general with cache memory, may be a form of fast memory (relatively faster than main memory which may be a form of RAM). In at least one embodiment, the CPU or processor cache is on the same die or chip as the processor and typically, like cache memory in general, is far more expensive to produce than normal RAM such as may be used as main memory. The processor cache may be substantially faster than the system RAM such as used as main memory and contains information that the processor will be immediately and repeatedly accessing. The faster memory of the CPU cache may, for example, run at a refresh rate that's closer to the CPU's clock speed, which minimizes wasted cycles. In at least one embodiment, there may be two or more levels (e.g., L1, L2 and L3) of cache. The CPU or processor cache may include at least an L1 level cache that is the local or private CPU cache dedicated for use only by that particular processor. The two or more levels of cache in a system may also include at least one other level of cache (LLC or lower level cache) that is shared among the different CPUs. The L1 level cache serving as the dedicated CPU cache of a processor may be the closest of all cache levels (e.g., L1-L3) to the processor which stores copies of the data from frequently used main memory locations. Thus, the system cache as described herein may include the CPU cache (e.g., the L1 level cache or dedicated private CPU/processor cache) as well as other cache levels (e.g., the LLC) as described herein. Portions of the LLC may be used, for example, to initially cache write data which is then flushed to the backend physical storage. For example, in at least one embodiment, a RAM based memory may be one of the caching layers used as to cache the write data that is then flushed to the backend physical storage. When the processor performs processing, such as in connection with the inline processing 105a, 105b as noted above, data may be loaded from the main memory and/or other lower cache levels into its CPU cache.

In at least one embodiment, the data storage system may be configured to include one or more pairs of nodes, where each pair of nodes may be generally as described and represented as the nodes 102a-b in the FIG. 2. For example, a data storage system may be configured to include at least one pair of nodes and at most a maximum number of node pairs, such as for example, a maximum of 4 node pairs. The maximum number of node pairs may vary with embodiment. In at least one embodiment, a base enclosure may include the minimum single pair of nodes and up to a specified maximum number of PDs. In some embodiments, a single base enclosure may be scaled up to have additional BE non-volatile storage using one or more expansion enclosures, where each expansion enclosure may include a number of additional PDs. Further, in some embodiments, multiple base enclosures may be grouped together in a load-balancing cluster to provide up to the maximum number of node pairs. Consistent with other discussion herein, each node may include one or more processors and memory. In at least one embodiment, each node may include two multi-core processors with each processor of the node having a core count of between 8 and 28 cores. In at least one embodiment, the PDs may all be non-volatile SSDs, such as flash-based storage devices and storage class memory (SCM) devices. It should be noted that the two nodes configured as a pair may also sometimes be referred to as peer nodes. For example, the node A 102a is the peer node of the node B 102b, and the node B 102b is the peer node of the node A 102a.

In at least one embodiment, the data storage system may be configured to provide both block and file storage services with a system software stack that includes an operating system running directly on the processors of the nodes of the system.

In at least one embodiment, the data storage system may be configured to provide block-only storage services (e.g., no file storage services). A hypervisor may be installed on each of the nodes to provide a virtualized environment of virtual machines (VMs). The system software stack may execute in the virtualized environment deployed on the hypervisor. The system software stack (sometimes referred to as the software stack or stack) may include an operating system running in the context of a VM of the virtualized environment. Additional software components may be included in the system software stack and may also execute in the context of a VM of the virtualized environment.

In at least one embodiment, each pair of nodes may be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes may not be shared with other pairs of nodes. A host may access data stored on a BE PD through the node pair associated with or attached to the PD.

In at least one embodiment, each pair of nodes provides a dual node architecture where both nodes of the pair may be identical in terms of hardware and software for redundancy and high availability. Consistent with other discussion herein, each node of a pair may perform processing of the different components (e.g., FA, DA, and the like) in the data path or I/O path as well as the control or management path.

In at least one embodiment, each node may internally include two dedicated PDs, such as two M.2 SATA flash devices. It should be noted that the two PDs internal to the node are in addition to other PDs of the base enclosure and possibly other enclosures, where such other PDs may be used for backend non-volatile storage of data. In this manner in at least one embodiment, the two internal PDs of a node may be dedicated for use only by that node and not used for backend non-volatile storage of data. The two internal PDs of each node may be referred to herein as a primary storage device or PD and a secondary storage device or PD. The primary PD may be the primary boot device for the node. The primary PD may include, for example, the base operating system and log files and may be used for general system operations. The secondary PD may be used as a recovery device during a failure of the primary PD, where the recovery device is used to restore or recover content to the primary PD.

During operation, a node of the data storage system may be booted or rebooted. However, the boot or reboot processing may be unable to boot from the primary PD. Described in the following paragraphs are techniques that may be used in connection with automatically assessing and evaluating the health and general state of the primary PD which was not able to be booted from, and determining whether to proceed with restoring content to the primary PD. The content restored to the primary PD may include an operating system and may allow for the node to be subsequently booted from the primary PD of the node. The content restored to the primary PD may also include other items that vary with embodiment such as, for example, other binary images and executables. The content restored may also include configuration data. The configuration data may include customizations made to the operating system and other software installed on the node, such as other software of the system software stack (described elsewhere herein). In at least one embodiment, the configuration data may be stored on one or more of the backend PDs attached or associated with the node.

The techniques provide for restoring the content to the primary PD of the node in an automated manner using content stored on the secondary PD of the node. The configuration data may also be restored and applied to the restored operating system and other restored software installed on the node.

The reboot or boot processing may be unable to boot from the primary PD for any number of reasons due to hardware and/or software problems with the primary PD of the node. If the node is unable to be booted using the primary PD, the boot processing may boot the recovery operating system on the secondary PD. The recovery operating system may perform processing, such as by execution of one or more scripts and/or executable code stored on the secondary PD, that assesses the state or health of the primary PD and determines whether the primary PD meets one or more conditions or criteria that trigger automatically restoring the contents of the primary PD. In at least one embodiment, if at least one of the conditions or criteria is met, processing may be performed to automatically restore the primary PD of the node using the secondary PD.

The one or more criteria or conditions that trigger automatically restoring the primary PD may include checking for the existence of one or more conditions of the primary PD in any suitable manner. For example, the primary PD that cannot be booted from may be a new PD that is blank or generally does not yet contain the content needed for booting. The new PD may be a replacement for a prior primary PD. The prior primary PD may have, for example, experienced a hardware failure or may have been at its end of life. As a result, the prior primary PD may have been replaced with the new primary PD that is blank and does not yet contain any content. As another example, the primary PD may experience a data corruption such as in connection with the operating system or other content stored on the primary PD needed for booting from the primary PD. In at least one embodiment, the one or more criteria may check for the existence of one or more conditions that indicate the primary PD is blank or has experienced a data corruption. For example, the criteria may include one or more of the following: determining that the primary PD does not include a bootable partition, and determining that the primary PD does not include a partition table.

In at least one embodiment, the configuration data may be stored on one or more BE PDs attached to the node. The configuration data may generally include any customizations made for the particular node in the prior installation of the operating system and software on the node. Thus the customizations of the prior installation may be recorded in the configuration data, where the configuration data may subsequently be retrieved and reapplied to the operating system and other software components of the system software stack in connection with the techniques herein.

In at least one embodiment, the BE PDs attached to the node may be configured in a RAID group, such as a RAID-5 level RAID group. Thus, the configuration data may be further protected from data loss and data unavailability due to the RAID group devices upon which the configuration data is stored.

In at least one embodiment, restoring the primary PD may include restoring the operating system and possibly other content from the secondary PD to the primary PD, and then rebooting the node from the restored operating system on the primary PD. Subsequent to rebooting the restored copy of the operating system on the primary PD, the configuration data may be retrieved from the backend PD and applied, as appropriate, to the operating system and other content on the primary PD as the system software stack is started. The system software stack may include the operating system restored to the primary PD and generally other software components (as may also be restored to the primary PD), where the operating system and other software components are started and loaded into memory for execution to service or process applications, commands, and the like, by the node. In at least one embodiment, the operating system restored to the primary PD may be based on a LINUX operating system. The system software stack may include control path or data path management functionality and endpoints, data path or I/O path functionality (e.g., block and/or file storage services), and the serviceability components such as staging and executing upgrades and remote support. Collectively, the components of the system software stack provide a platform for servicing I/O requests, for servicing data storage system management requests, and the like. Additionally, other applications hosted on the node may be characterized as running on top of the system software stack whereby the application may issue requests that are serviced by components of the system software stack at runtime. The configuration data may be applied, for example, by updating files of the operating system and other components of the system software stack with user-specified customization, by enabling and disabling particular software components of the system software stack based on user-specified customizations, and the like.

In at least one embodiment, the recovery operating system may be characterized as a minimal operating system with reduced functionality as compared, for example, to a typical operating system installed as part of a normal or regular installation. For example, the recovery operating system of the secondary PD may have minimal or reduced functionality in comparison to the operating system (also referred to as the core or base operating system elsewhere herein) stored on the primary PD. In the following paragraphs, the operating system as stored on the primary PD as part of an installation and also copied to the primary PD as part of processing of the techniques herein may be referred to as the base or core operating system.

The foregoing and other aspects of the techniques herein are described in more detail in following paragraphs.

Figure 3:
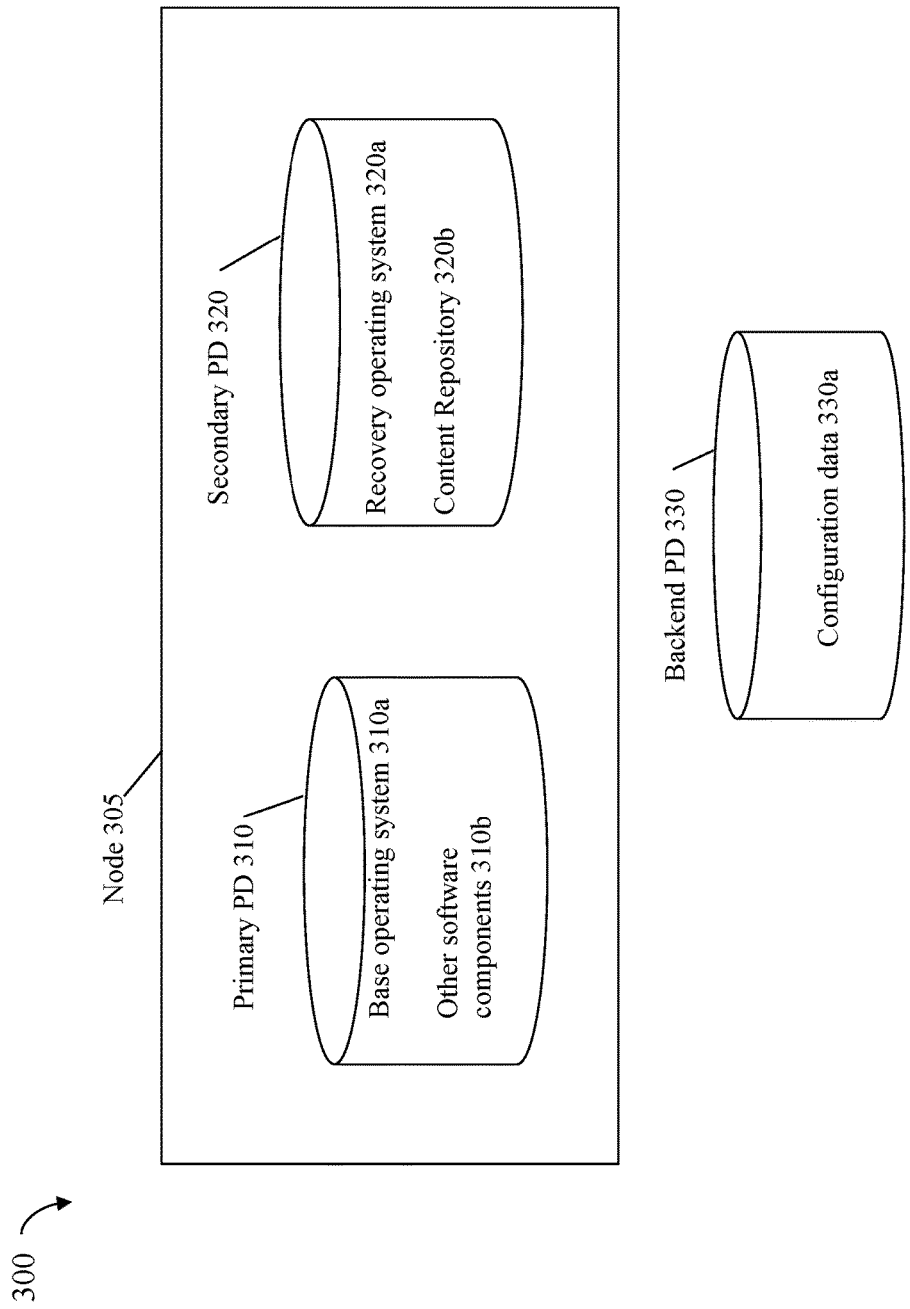
FIG. 3 is an example illustrating internal physical storage devices of a node and a backend physical storage device attached to the node for use in connection with the techniques herein.

Referring to FIG. 3, shown is an example illustrating PDs and information that may be stored and used in connection with a node in an embodiment in accordance with the techniques herein. The example 300 includes a primary PD 310, a secondary PD 320, and a BE PD 330. The primary PD 310 and the secondary PD may be the two internal PDs of the single node 305. The single node 305 may denote one of the nodes as discussed above, such as the processing node A 102a of FIG. 2. The BE PD 330 may be one of multiple PDs providing BE non-volatile storage for configured LUNs accessed using the processing node 305. The primary PD 310 may be designated as the primary boot device of the node 305, and the secondary PD 320 may be designated as the secondary boot device of the node 305.

The example 300 represents information that may be stored on the PDs 310, 320 and 330 at a first point in time after an initial installation of software on the node 305. The initial installation may include installing the base operating system 310a and other software components 310b on the node 305, receiving any user specified customizations for the initial installation, and loading and starting the system software stack in accordance with the user specified customizations. The system software stack may include the base operating system and the other software components further customized based on the user specified customizations. The user specified installation customizations of the initial installation may be captured and stored in the configuration data 330a, such as stored on the backend PD 330. The initial installation processing may include populating the primary PD 310 and the secondary PD 320 with content as generally illustrated in the FIG. 3. The initial installation may include populating the primary PD 310 with the base operating system 310a as well as the other software components 310b. The other software components 310b may include other software of the system software stack that may be started and loaded as part of the initial installation. Additional details of what may be included in the other software components 310b are described elsewhere herein. The initial installation may include populating the secondary PD 320 with the recovery operating system 320a and the content repository 320b. Generally, the content of the secondary PD 320 may be used in connection with the techniques herein to automatically restore or recover the content of the primary PD 310. For example, the content repository 320b may include a copy of the base operating system, scripts and other executable code embodying processing logic to restore the contents of the primary PD 310, other software components of the system software stack, and other content that may vary with embodiment. The scripts and other executable code may be executed as part of recovery or restoration processing in accordance with the techniques herein that populates the primary PD 310 with the copies of the base operating system and other software components of the system software stack as stored on the secondary PD 320. Additional details of what may be included in the content repository 320b, or more generally on the secondary PD 320, are described elsewhere herein. Consistent with other discussion herein and although not illustrated in FIG. 3 for simplicity, another second node is also connected to the node 305 and also has access to the backend PD 330.

It should be noted that although the discussion herein may refer to the initial installation of software on the node, more generally, the initial installation may be any prior installation of the software on the node that is prior in terms of time to rebooting the node and performing the techniques herein.

The configuration data 330a may generally include customizations performed in the initial installation. The configuration data 330a may be persistently stored on the BE PD 330 as part of the initial installation. Additional details of the customizations and other information that may be included in the configuration data 330a are described elsewhere herein in more detail.

It should be noted that software upgrades or updates performed to the node 305 subsequent to the initial installation may include applying any suitable updates or upgrades to contents stored on both the primary PD 310 and the secondary PD 320 of the node, and also any suitable updates or upgrades to the customizations of the stored configuration data 330a.

Subsequent to successfully completing the initial installation on the node 305, the node 305 is executing the base operating system and other software components of the system software stack, where the base operating system and other components are customized as described in the configuration data of the initial installation. Also, after completing the initial installation on the node 305, the primary PD 310 is functional and includes the base operating system and other software components, as customized during the initial installation; and the secondary PD 320 may be characterized as having a passive stand-by role.

Subsequent to the initial installation, the node 305 may be rebooted generally for any reason. In at least one embodiment in connection with the techniques herein, the node 305 may be rebooted, for example, subsequent to replacing an existing primary PD of the node with a new primary PD of the node. For example, the existing primary PD of the node may have experienced hardware errors or failures, reached its end of life, and the like. In this case, the new primary PD may be blank or uninitialized, where the new primary PD does not contain a partition table or any configured partitions. Subsequent to replacing the existing primary PD with a new primary PD, the node may be rebooted. As another example, in at least one embodiment, the existing primary PD of the node may not be replaced with a new primary PD. Rather, the existing primary PD may experience an event, such as a data corruption, of data stored on the existing primary PD. The data corruption may be, for example, a corruption of the partition table or bootable partition of the existing primary PD 310. As a result, the existing primary PD 310 may experience various errors and may no longer be bootable. Responsive to receiving the errors due to the data corruption of the existing primary PD, the node may be rebooted as described further in connection with FIG. 4 processing below.

Figure 4:
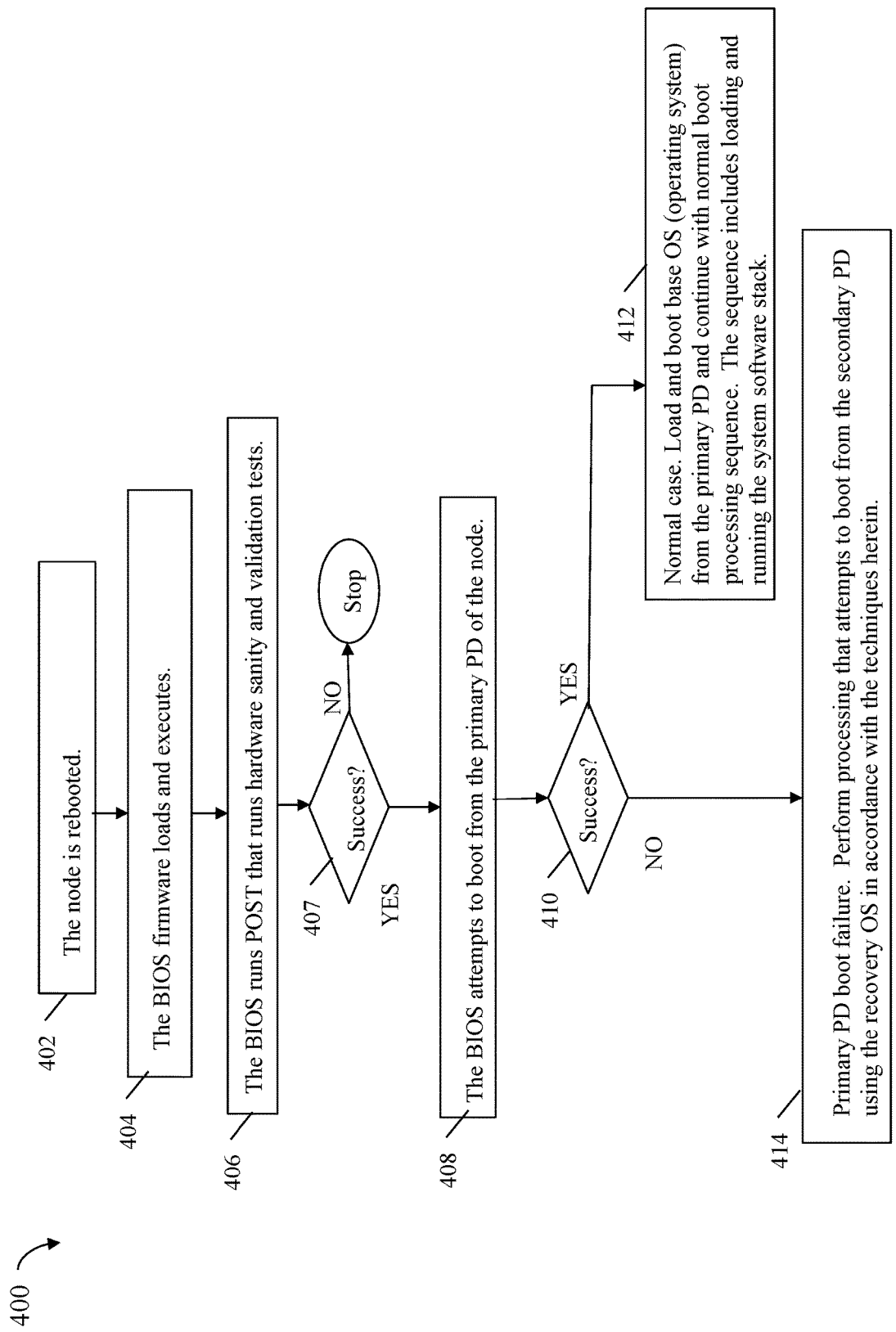
FIGS. 4, 5 and 6 are flowcharts of processing steps that may be performed in an embodiment in accordance with the techniques herein.

With reference to FIG. 4, shown is a flowchart 400 summarizing the reboot processing sequence for the node having the primary PD 310, secondary PD 320 and attached BE PDs in at least one embodiment in accordance with the techniques herein. Generally, the flowchart 400 may be performed subsequent to the initial or prior installation of software on the node, where the software may include the base operating system and other software components of the system software stack as described elsewhere herein.

At the step 402, the node is rebooted. Examples of certain events that may result in rebooting the node are discussed above. More generally, the node may be rebooted for any reason, either manually or automatically. From the step 402, control proceeds to the step 404 where the BIOS (Basic Input Output System) loads and executes. Generally, the BIOS is firmware that performs processing to initialize hardware components, such as memory, of the node. From the step 404, control proceeds to the step 406 where the BIOS runs POST (Power On Self Test). As known in the art, POST processing generally includes performing sanity and validation tests to ensure the integrity and proper functioning of the hardware, such as memory, the internal node PDs, and the like. From the step 406, control proceeds to the step 407 where a determination is made as to whether the POST processing completed successfully. If the step 407 evaluates to no or false, where it is determined that the POST fails to complete successfully, the node may not be usable and the boot or reboot processing of the flowchart 400 may stop. If the step 407 evaluates to yes, where it is determined that the POST has completed successfully, control proceeds to the step 408.

At the step 408, the BIOS attempts to boot from the primary PD of the node. In at least one embodiment in connection with the step 408 when the BIOS attempts to boot from the primary PD of the node, the BIOS examines the primary PD for a valid bootable partition. As known in the art, an initialized or configured (e.g. non-blank) healthy PD, such as the primary PD 310, the secondary PD 320 and the backend PD 330, may include a partition table describing the partitions of the PD. The partition table may generally indicate, for example, how the storage space of the PD is divided and allocated among the different partitions of the PD. The partition table may indicate, for example, locations or addresses on the PD of where each partition begins and ends, which partition(s) are bootable, what file system (if any) exists within a partition, and other information. A partition may have an associated partition property, attribute or flag indicating whether or not the partition is boot. For example, the partition may have a boot flag set indicating that the partition is a boot partition. A boot partition of a PD includes an operating system that may be used to boot the node. The operating system of the boot partition may be loaded and executed as part of the processing performed to boot or reboot the node. Thus, in the step 408, successfully booting from the primary PD 310 includes locating a partition designated as a boot partition, and then successfully loading and executing the base operating system 310a included in the boot partition.

From the step 408, control proceeds to the step 410. At the step 410, a determination is made as to whether booting from the primary PD of the node in the step 408 is successful. If the step 410 evaluates to yes, control proceeds to the step 412 denoting the normal case or normal processing. At the step 412, the base operating system is loaded from the primary PD and booted. In the step 412, processing continues with normal boot processing that includes loading and running the system software stack. It should be noted that the base operating system and the system software stack loaded and running in connection with the step 412 may be customized in accordance with user-specified customization provided in the prior installation, and where such customizations are included in the configuration data persistently stored on the BE PD.

If the step 410 evaluates to no, where the node is unable to boot from the primary PD, control proceeds to the step 414. At the step 414, processing may be performed to attempt to boot the node using the secondary PD of the node. In particular, the step 414 includes attempting to boot the node, in accordance with the techniques herein, from the secondary PD using the recovery operating system.

What will now be described in more detail is processing that may be performed in connection with the step 414 upon the occurrence of the node's primary PD boot failure where the BIOS then attempts to boot the node from the secondary PD of the node. In particular, the flowchart 500 of FIG. 5 and the flowchart 600 of FIG. 6 are described below providing further details regarding processing of the step 414 in an embodiment in accordance with the techniques herein.

Figure 5:
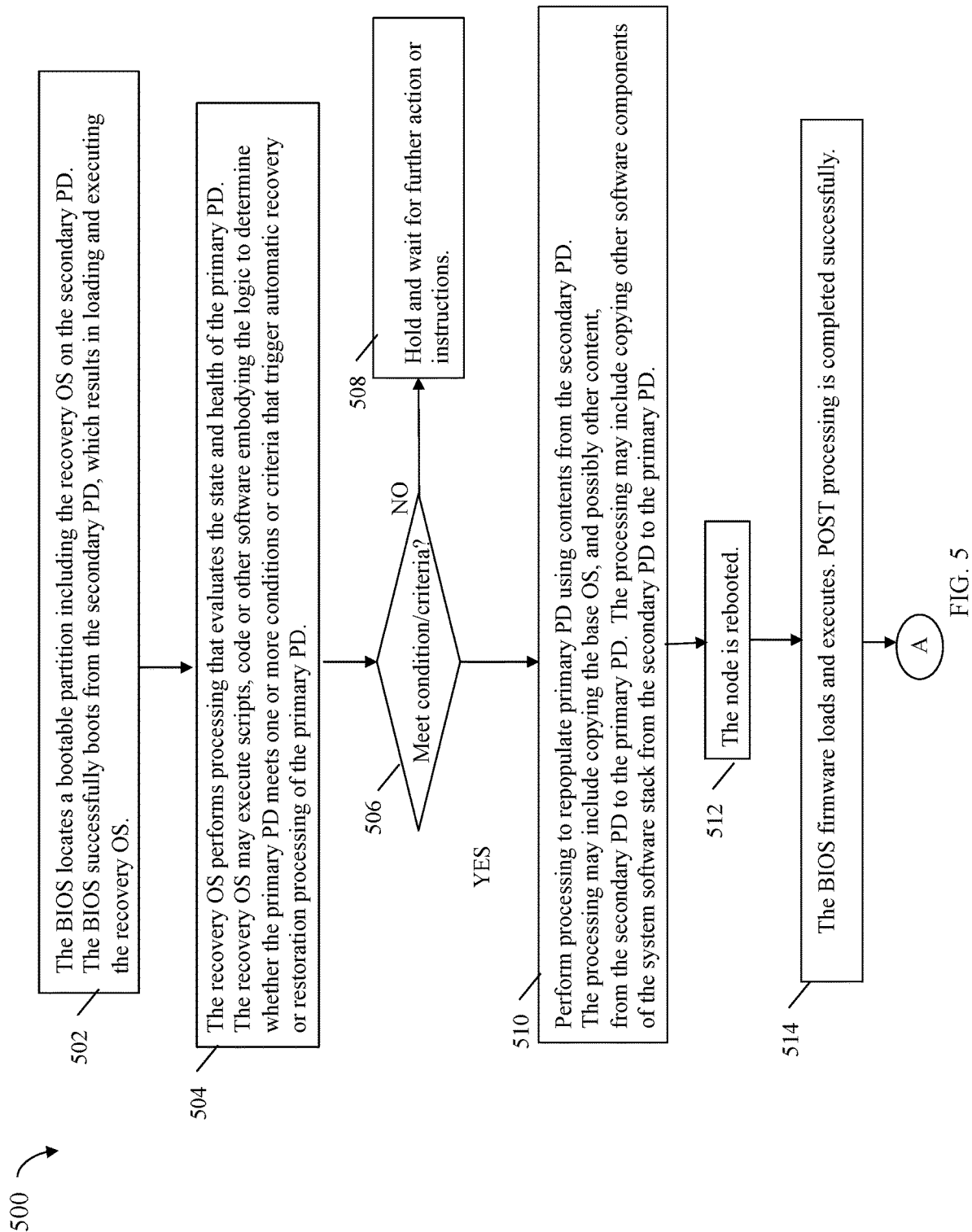
Figure 6:
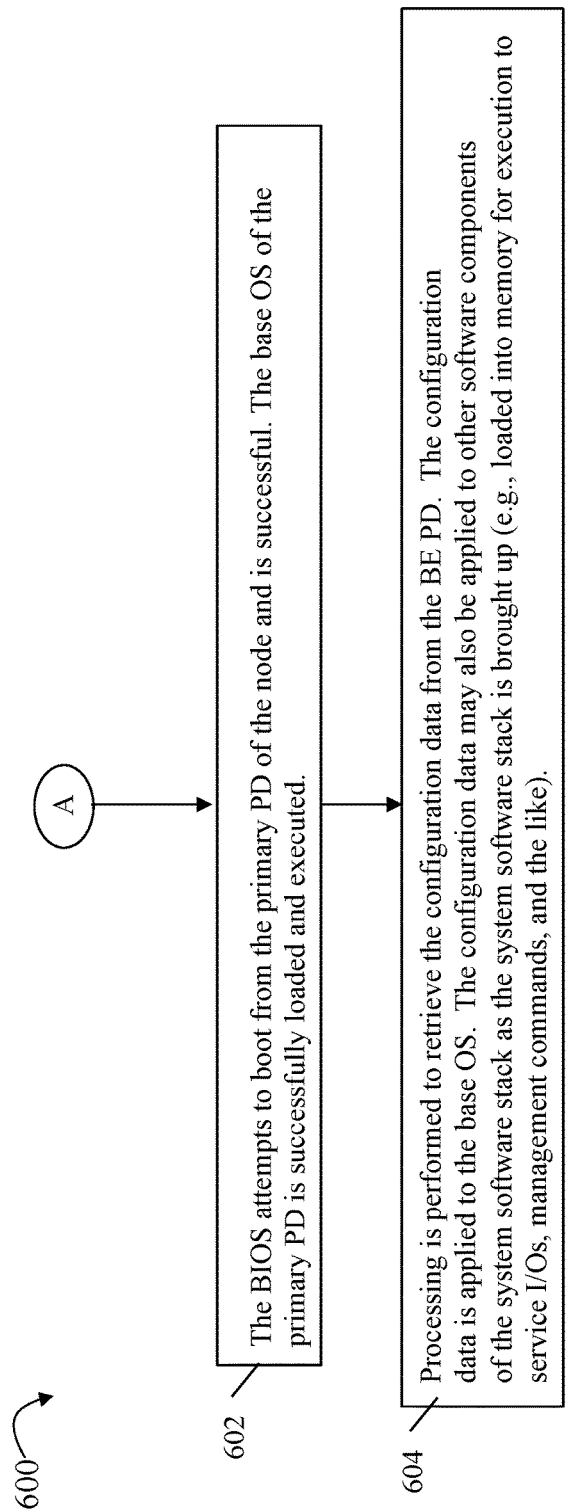

In at least one embodiment in connection with the step 414 above when the BIOS attempts to boot from the secondary PD of the node, the step 502 of FIG. 5 may be performed. In the step 502, the BIOS examines the secondary PD for a valid bootable partition. Consistent with discussion elsewhere herein in at least one embodiment, a valid bootable partition of the secondary PD means that the secondary PD includes a partition table and also include a partition designated as a boot partition. Furthermore, the boot partition of the secondary PD in accordance with the techniques herein includes the recovery operating system 320a. Thus, in the step 414, successfully booting from the secondary PD 320 includes locating a partition designated as a boot partition on the secondary PD 320, and then successfully loading and executing the recovery operating system 320a included in the boot partition. From the step 502, control proceeds to the step 504.

At the step 504, the recovery operating system performs processing that evaluates the state and health of the primary PD of the node. The recovery operating system may execute scripts, code or other software embodying the logic (also stored on the secondary PD) to determine whether the primary PD meets one or more conditions or criteria that trigger automated recovery or restoration processing of the primary PD of the node. The criteria may include one or more indicators denoting a blank (e.g., uninitialized) primary PD, and an unhealthy or corrupted state of the primary PD, whereby, if any one of such criteria are met, processing may be performed for automatic restoration or recovery of the primary PD. Consistent with other discussion herein, the criteria may include determining that the primary PD does not include a partition table, determining that the primary PD includes a partition table but does not include a bootable partition, determining that one or more hardware and/or software errors occur when trying to access (e.g., read from) the primary PD, and the like. The one or more conditions or criteria may generally denote a defective, faulty, unusable, data corrupted or unhealthy state for the primary PD, and content stored on the primary PD, requiring recovery or restoration of the contents of the primary PD.

From the step 504, control proceeds to the step 506 where a determination is made as to whether one or more of the conditions or criteria triggering automated recovery or restoration of the primary PD are met. If the step 506 evaluates to no, control proceeds to the step 508. In connection with the step 508, it may be that the system is unable to boot from the primary PD but the primary PD still does not meet one of the specified conditions or criteria that trigger automatic recovery or restoration of the primary PD. In this case, the recovery operating system may simply remain in a hold and wait state (step 508), whereby the recovery operating system pauses processing and waits for further user specified instructions or actions.

If the step 506 evaluates to yes, control proceeds to the step 510. In the step 510, processing may be performed to repopulate the primary PD using contents from the secondary PD. The processing of the step 510 may include copying the base operating system, and possibly other content, from the secondary PD to the primary PD. The processing of the step 510 may include copying other software components of the system software stack from the secondary PD to the primary PD. From the step 510, control proceeds to the step 512.

At the step 512, the recovery operating system may cause the node to reboot. From the step 512, control proceeds to the step 514. At the step 514, the BIOS firmware loads and executes, and then POST processing is completed successfully. The foregoing processing of the step 514 is similar to processing described in connection with the steps 404 and 406 of FIG. 4). From the step 514, control proceeds to the step 602.

At the step 602, the BIOS attempts to boot from the primary PD of the node and is successful, where the base operating system of the primary PD is successfully loaded and executed. In connection with the step 602, a bootable partition including the base operating system may be located on the primary PD, and processing may then include loading and executing the base operating system of the primary PD. From the step 602, control proceeds to the step 604. At the step 604, processing is performed to retrieve the configuration data from the BE PD. Portions of the configuration data may then be applied, as appropriate, to the base operating system of the primary PD in order to customize the base operating system in accordance with any such customizations from the initial or prior installation. Portions of the configuration data may also be applied, as appropriate, to other software components of the system software stack as the system software stack is brought up (e.g., loaded into memory for execution to service I/Os, management commands, and the like). For example, the configuration data may indicate a prior installation option to enable or disable, or generally configure, a particular software component of the system software stack.

As discussed elsewhere herein, the configuration data generally includes customizations performed at a first point in time as part of the last installation of the base operating system and other software components of the system software stack. Subsequent to the first point in time, the node is rebooted and as part of the reboot processing, the BIOS has not found a bootable partition on the primary PD and processing is performed that boots the node from the bootable partition of the secondary PD including the recovery operating system. As a result, the recovery operating system of the secondary PD is loaded and executed and performs processing to determine whether one or more conditions or criteria are met indicating that the primary PD is defective, faulty, data corrupted, unusable or unhealthy. Assuming at least one of the conditions or criteria of the primary PD are meet, the recovery operating system then performs processing that restores content, such as the base operating system, to the primary PD from the secondary PD, and again reboots the node. This time, the BIOS detects the primary PD is bootable and boots the base operating system from the primary PD. Subsequent to booting the base operating system from the primary PD, the configuration data may be applied to customize the base operating system and other software components of the system software stack. In at least one embodiment, system software may be executed when starting the system as part of rebooting, where the system software detects that customizations (as described in the configuration data 330a) are missing, and thus triggers subsequent processing to locate, obtain and apply the configuration data 330a. Applying the configuration data to the base operating system may include updating portions of the base operating system with some of the configuration data. The configuration data may also be applied as the system software stack is brought up (e.g., built, loaded and executed) by identifying particular software components, services or layers to include in the system software stack or otherwise identifying particular software components, services or layers of the system software stack that are enabled or disabled.

What will now be described is further detail regarding information that may be included in the configuration data in an embodiment in accordance with the techniques herein. The configuration data may be specified as part of the installation of the base operating system and other software components included in the installation. In at least one embodiment, the configuration data may include one or more files or pieces of customization information applicable to configured installation customizations.

The configuration data may include a user specified name of the node and a user specified name of the data storage system including the node. The foregoing user specified name may be human readable or clear text names used by the user to reference and identify the node and the data storage system including the node. The user specified names may be included in one or more files of the configuration data.

The configuration data may include various IP (internet protocol) addresses used by the base operating system or other software component, where such IP addresses may be specified as part of the installation of the base operating system and such other software component. For example, the IP addresses may include a first IP address of a server from which to obtain time and date information, a second IP address of a DNS (Domain Name Server) server, and one or more IP addresses of the file servers or other published services or data storage system interfaces of the node that are exposed to clients of the data storage system. The IP addresses customized for the installation may be included in one or more files of the configuration data.

The configuration data may include security options, policies and host access information. For example, the host access information may identify the IP addresses of various hosts that are clients of a node, and may further identify the particular type of access the hosts have to one or more identified file systems hosted on the node for servicing file I/O and other file-based commands.

The configuration data may include an installation generated identifier (ID) for the node and an installation generated ID for the data storage system or base enclosure including the node. In at least one embodiment, the installation generated ID for the node may be a random number used to uniquely identify and reference the node. Similarly, the installation generated ID for the data storage system or base enclosure may be a random number used to uniquely identify and reference the system or base enclosure. The installation generated IDs may be included in one or more files of the configuration data. In at least one embodiment, the installation generated ID for the node may be used to tag or identify the BE PDs attached and used by the node. For example, when a BE PD is used or attached to a node, the node's installation generated ID may be stored at a predetermined reserved location on the BE PD. At later points in time, such as when the data storage system or node is rebooted, processing may be performed that attaches the node to BE PDs including the node's installation generated ID. In this manner, the node may avoid inadvertently accessing or using a foreign BE PD that is from a different node or system, where the foreign BE PD may have been connected to the node by a user. Thus, the installation generated ID for the node may be used to detect changes made to BE PDs accessible to the node, for example, to detect whether a particular BE PD was replaced. If processing does not locate the node's installation generated ID on the BE PD, it may indicate that the BE PD is a new replacement PD, or may indicate that the BE PD was improperly connected to the node by a user. In any case, a notification may be made to the user if processing does not locate the node's installation generated ID on the BE PD connected to the node.

The configuration data may include customized files needed for use with remote support for the data storage system and the node. The files may be needed for data collection and communication with a vendor or other party's website. For example, the customized files may provide for collecting various metrics or other information about a node, and then facilitate sending the collected information to a third party's website or other network location.

The configuration data may include customization made to various software components and services included in the system software stack. The node may be configured to provide various services selected or enabled as part of the installation. For example, in at least one embodiment, the node may be configured to provide block storage services but not file storage services. As a variation, the node may be configured as unified to provide both block and file storage services. If file storage services are enabled, it may be a further customization option to configure which of the supported particular file access protocols are enabled and which are disabled. For example, supported file access protocols may include multiple versions of NFS such as NFSv3, NFv4, NFSv4.1; CIFS (common internet file server), FTP (file transfer protocol), multiple versions of SMB (server message block) such as SMB 2, 3.0, 3.02 and 3.1.1; and the like. The configuration data may indicate a customization, for example, in that only a particular version of NFS is enabled with all other supported file access protocols disabled. In at least one embodiment, the configuration data may include the customizations of the file access protocols, where such customizations identify which supported file access protocols are enabled and which are disabled. When the system software stack is being built, loaded and started, processing may apply such customizations in any suitable manner. For example, in at least one embodiment, the file access protocols that are disabled may be omitted from the system software stack or may be otherwise disabled using other suitable means.

In at least one embodiment, the configuration data for the node may be stored in any suitable location on any one or more of the BE PDs attached to the node. A node may store its configuration data at one or more predetermined or preconfigured locations on the BE PDs attached to the node. In at least one embodiment, the configuration data for a node may be stored on a specified or predetermined subset of the BE PDs attached to the node. For example, each BE PD attached to a pair of nodes may include a reserved or private portion of its storage used for use by the nodes or system. The reserved or private portion of a BE PD may be configured into fixed slices of LBA ranges used or owned by each node with a particular node ID, such as each installation generated ID for the node. For example, node A may own blocks 4-8 of the reserved section of each BE PD attached to the node A; and node B may own blocks 9-12 of the reserved section of each BE PD attached to node B. Node A may store its configuration data on blocks 4-8 of the reserved section of any one or more PDs attached to node A. Node B may store its configuration data on blocks 9-12 of the reserved section of any one or more PDs attached to node B.

What will now be described in more detail are examples of content that may be stored on the secondary PD of a node such as, for example, as included in the content repository 320b, or more generally any suitable location, on the secondary PD 320.

In at least one embodiment, the secondary PD 320 may include scripts, code, and the like, that embodies logic for performing processing as described herein such as in connection with the FIGS. 4, 5, and 6. For example, the secondary PD 320 may include scripts, code, and the like, that embodies logic for evaluating the state and health of the primary PD of a node (e.g., step 504 processing) to determine whether the primary PD meets one or more conditions or criteria that trigger automatic recovery or restoration processing of the primary PD, and then accordingly either performs the recovery or restoration processing for the primary PD (e.g., steps 510 and 512) or otherwise holds and waits for further instructions or action (e.g., step 508). Such scripts, code, and the like, of the secondary PD may perform processing that repopulates the primary PD using content stored on the secondary PD. The content stored on the secondary PD may include the base operating system (e.g., uncustomized) and other components (e.g., uncustomized) of the system software stack. The base operating system and other software components on the secondary PD may be characterized as uncustomized in that they have not yet been customized in connection with an installation. The software components of the system software stack stored on the secondary PD 320 may include control path or data path management functionality and endpoints, data path or I/O path functionality (e.g., block and/or file storage services), and the serviceability components such as staging and executing upgrades and remote support. The secondary PD 320 may include a bootable partition with the recovery operating system.

In at least one embodiment in which the base operating system and system software stack execute in a virtualized environment, the secondary PD 320 may include the VM hypervisor software, a disk image of a VM, and possibly other components needed to host the virtualized environment. In such an embodiment, the scripts or code of the secondary PD 320 performing processing in accordance with the techniques herein may also include populating the primary PD 310 with additional software components needed for hosting the virtualized environment for the base operating system and system software stack. In such an embodiment, the configuration data for a node may also include any necessary added customizations needed for the virtualized environment, where the added customizations are also applied such as in the step 604 of FIG. 6.

The secondary PD 320 may also include the latest versions or upgrades to firmware, such as the BIOS firmware, used by a node. In at least one embodiment, the firmware such as for the BIOS may be upgraded, as needed, and used in connection with performing the techniques herein to ensure that the latest firmware versions are used.

In at least one embodiment, validation and corruption checking of the secondary PD of a node may be performed on every boot or reboot during system software stack initialization. Corruption detection may be accomplished in any suitable manner. For example, in at least one embodiment, corruption detection of the secondary PD of a node may include comparing the checksums of backed up or saved files on the secondary PD with previously saved checksum values for the files also stored on the secondary PD. The previously saved checksums may have been stored on the secondary PD, for example, when the secondary PD was populated with the files or content. If corruption detection determines that the data on the secondary PD is corrupted, processing may be performed to restore the corrupted secondary PD of the node from its peer node's secondary PD. For example, a first node of the pair having a corrupted secondary PD may be restored by copying contents from the second PD of its peer node of the pair. The copying and other internode communication may be performed over the internode communication connection 120 of FIG. 2. Thus, source code logic may be used perform the processing needed to completely rebuild the corrupted secondary PD of the first node thereby restoring the corrupted secondary PD to have its original uncorrupted content (e.g. including the recovery operating system in a bootable partition, scripts and other executable code used in recovery processing, other software components of the system software stack, and other content as described herein that may vary with embodiment).

In at least one embodiment as described herein, the configuration data may be stored on one or more BE PDs attached to the node. More generally, the configuration data may be stored on any suitable storage device and location so long as the configuration data is available when performing the processing herein to restore or recover the primary PD of the node. For example, as a variation, the configuration data may be stored on the secondary PD of the node.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of rebooting a node comprising:
 performing first processing that fails to reboot the node using a primary storage device of the node;
 responsive to the first processing failing to reboot the node using the primary storage device of the node, performing second processing that reboots the node using a secondary storage device of the node and executes a recovery operating system of the secondary storage device;
 determining, by the recovery operating system executing first code, whether the primary storage device of the node meets one or more criteria indicating that the primary storage device is faulty or defective; and
 responsive to determining the primary storage device of the node meets the one or more criteria, performing third processing that restores the primary storage device using the secondary storage device, wherein configuration data includes customizations performed to a base operating system and one or more software components during a first installation performed prior to performing the method, and wherein the third processing includes:
 customizing the base operating system and the one or more software components restored to the primary device in accordance with the customizations of the configuration data, wherein the configuration data is stored on a third storage device attached to the node, wherein the third storage device is configured to include at least one logical device, and wherein the third storage device provides back-end non-volatile physical storage provisioned for the at least one logical device.

2. The method of claim 1, wherein the one or more criteria indicate one or more conditions denoting a health and status of the primary storage device.

3. The method of claim 1, wherein the one or more criteria includes determining that the primary storage device does not include a valid partition table.

4. The method of claim 1, wherein the one or more criteria includes determining that the primary storage device does not include a bootable partition.

5. The method of claim 1, wherein the secondary storage device includes first content and wherein the third processing includes populating the primary storage device with the first content of the secondary storage device.

6. The method of claim 5, wherein the first content includes the base operating system.

7. The method of claim 5, wherein the first content includes the one or more software components of a system software stack.

8. The method of claim 7, wherein the one or more software components include a first component that performs block storage services, a second component that performs file storage services, a third component that is included in the data path or I/O path, and a fourth component that is included in the control path or management path.

9. The method of claim 1, wherein the configuration data includes a first customization indicating whether block storage services are enabled for the node and includes a second customization indicating whether file storage services are enabled for the node.

10. The method of claim 1, wherein the second processing includes:
locating a bootable partition of the secondary storage device, wherein the bootable partition includes the recovery operating system;
booting the node using the bootable partition; and
loading and executing the recovery operating system of the bootable partition of the secondary storage device.

11. The method of claim 1, wherein the primary storage device and the secondary storage device are internal storage devices of the node.

12. The method of claim 1, wherein the primary storage device is designated as the primary boot device and the secondary storage device is designated as the secondary boot device.

13. A system comprising:
one or more processors; and
a memory comprising code stored thereon that, when executed, performs a method of rebooting a node comprising:
performing first processing that fails to reboot the node using a primary storage device of the node;
responsive to the first processing failing to reboot the node using the primary storage device of the node, performing second processing that reboots the node using a secondary storage device of the node and executes a recovery operating system of the secondary storage device;
determining, by the recovery operating system executing first code, whether the primary storage device of the node meets one or more criteria indicating that the primary storage device is faulty or defective; and
responsive to determining the primary storage device of the node meets the one or more criteria, performing third processing that restores the primary storage device using the secondary storage device, wherein configuration data includes customizations performed to a base operating system and one or more software components during a first installation performed prior to performing the method, and wherein the third processing includes:
customizing the base operating system and the one or more software components restored to the primary device in accordance with the customizations of the configuration data, wherein the configuration data is stored on a third storage device attached to the node, wherein the third storage device is configured to include at least one logical device, and wherein the third storage device provides back-end non-volatile physical storage provisioned for the at least one logical device.

14. A non-transitory computer readable medium comprising code stored thereon that, when executed, performs a method of rebooting a node comprising:
performing first processing that fails to reboot the node using a primary storage device of the node;
responsive to the first processing failing to reboot the node using the primary storage device of the node, performing second processing that reboots the node using a secondary storage device of the node and executes a recovery operating system of the secondary storage device;
determining, by the recovery operating system executing first code, whether the primary storage device of the node meets one or more criteria indicating that the primary storage device is faulty or defective; and
responsive to determining the primary storage device of the node meets the one or more criteria, performing third processing that restores the primary storage device using the secondary storage device, wherein configuration data includes customizations performed to a base operating system and one or more software components during a first installation performed prior to performing the method, and wherein the third processing includes:
customizing the base operating system and the one or more software components restored to the primary device in accordance with the customizations of the configuration data, wherein the configuration data is stored on a third storage device attached to the node, wherein the third storage device is configured to include at least one logical device, and wherein the third storage device provides back-end non-volatile physical storage provisioned for the at least one logical device.

15. The non-transitory computer readable medium of claim 14, wherein the one or more criteria includes determining that the primary storage device does not include a valid partition table.

16. The non-transitory computer readable medium of claim 14, wherein the one or more criteria includes determining that the primary storage device does not include a bootable partition.

17. The non-transitory computer readable medium of claim 14, wherein the secondary storage device includes first content and wherein the third processing includes populating the primary storage device with the first content of the secondary storage device.

18. A method of rebooting a node comprising:
performing first processing that fails to reboot the node using a primary storage device of the node;
responsive to the first processing failing to reboot the node using the primary storage device of the node, performing second processing that reboots the node using a secondary storage device of the node and executes a recovery operating system of the secondary storage device;
determining, by the recovery operating system executing first code, that the primary storage device of the node meets one or more criteria indicating that the primary storage device is faulty or defective;
responsive to determining the primary storage device of the node meets the one or more criteria, restoring a copy of the base operating system to the primary storage device from the secondary storage device;
subsequent to said restoring, rebooting the node using the copy of the base operating system restored on the primary storage device;

subsequent to said rebooting the node using the copy of the base operating system restored on the primary storage device, retrieving configuration data and applying at least a first portion of the configuration data to software components of a system software stack as said system software stack is loaded into memory for execution.

19. The method of claim 18, wherein said applying the at least first portion of the configuration data includes any of configuring, enabling and disabling a particular software component of the system software stack based on a user-specified customization identified in the configuration data.

\* \* \* \* \*